United States Patent
Mao et al.

(10) Patent No.: US 11,836,878 B2
(45) Date of Patent: Dec. 5, 2023

(54) METHOD AND APPARATUS FOR CONSTRUCTING REAL-GEOGRAPHIC-SPACE SCENE IN REAL TIME

(71) Applicants: PEKING UNIVERSITY, Beijing (CN); Beijing LongRuan Technologies Inc., Beijing (CN)

(72) Inventors: Shanjun Mao, Beijing (CN); Yingbo Fan, Beijing (CN); Ben Li, Beijing (CN); Huazhou Chen, Beijing (CN); Xinchao Li, Beijing (CN)

(73) Assignees: PEKING UNIVERSITY, Beijing (CN); Beijing LongRuan Technologies Inc., Beijing (CN)

( * ) Notice: Subject to any disclaimer, the term of this patent is extended or adjusted under 35 U.S.C. 154(b) by 0 days.

(21) Appl. No.: 18/144,860

(22) Filed: May 9, 2023

(65) Prior Publication Data

US 2023/0360338 A1 Nov. 9, 2023

(30) Foreign Application Priority Data

May 9, 2022 (CN) .......................... 202210499659.0

(51) Int. Cl.
*G06T 19/00* (2011.01)
*H04N 23/698* (2023.01)
(Continued)

(52) U.S. Cl.
CPC ............ *G06T 19/006* (2013.01); *G06T 5/006* (2013.01); *G06T 5/50* (2013.01); *H04N 5/265* (2013.01);
(Continued)

(58) Field of Classification Search
None
See application file for complete search history.

(56) References Cited

U.S. PATENT DOCUMENTS 6,778,207 B1 8/2004 Lee et al.
11,042,997 B2 6/2021 Wen et al.
(Continued)

FOREIGN PATENT DOCUMENTS

CN 108933902 A 12/2018
WO 2017173735 A1 10/2017
(Continued)

OTHER PUBLICATIONS

Ben Li, et al., Video Stitching method for a Surveillance System Deployed at a Fully Mechanized Mining Face, Research Square, 2021, pp. 1-17.

*Primary Examiner* — David H Chu
(74) *Attorney, Agent, or Firm* — Bayramoglu Law Offices LLC

(57) ABSTRACT

A method for constructing a real-geographic-space scene in real time based on a panoramic-video technique is provided. By using a measuring robot and the attitude sensors, accurately determining the geographic coordinates and the attitudes of the cameras, where the cameras may be installed in a fixed or stringing manner, where in the fixing type a plurality of neighboring videos at the same moment undergo orthographic correction and splicing, and in the stringing type the cameras are installed to a guiding device and may locally, independently and quickly move and shoot, and the videos of the neighboring cameras are spliced in real time; and fusing the videos, the geographic coordinates and the environment sounds that satisfy the delay time, to form a scene video streaming.

12 Claims, 4 Drawing Sheets

(51) Int. Cl.
  *G06T 5/00* (2006.01)
  *H04N 23/90* (2023.01)
  *H04N 7/18* (2006.01)
  *H04N 5/265* (2006.01)
  *H04N 23/661* (2023.01)
  *H04N 23/695* (2023.01)
  *G06T 5/50* (2006.01)

(52) U.S. Cl.
  CPC ........... *H04N 7/181* (2013.01); *H04N 23/661* (2023.01); *H04N 23/695* (2023.01); *H04N 23/698* (2023.01); *H04N 23/90* (2023.01); *G06T 2207/10016* (2013.01); *G06T 2207/20221* (2013.01)

(56) References Cited

U.S. PATENT DOCUMENTS

| | | | |
|---|---|---|---|
| 2002/0122113 A1* | 9/2002 | Foote | H04N 13/243 348/48 |
| 2008/0082213 A1* | 4/2008 | Ban | B25J 9/1697 901/50 |
| 2018/0262789 A1 | 9/2018 | Foulzitzis et al. | |
| 2021/0127059 A1* | 4/2021 | Powell | G06T 5/006 |
| 2021/0217244 A1 | 7/2021 | Wei et al. | |

FOREIGN PATENT DOCUMENTS

| | | |
|---|---|---|
| WO | 2021208648 A1 | 10/2021 |
| WO | 2021238804 A1 | 12/2021 |

\* cited by examiner

101 — by a high-performance computing device, receiving image data collected by a plurality of panoramic cameras, and combining the image data into an image-data sequence, wherein the plurality of panoramic cameras are controlled by using a remote-control instruction, and the plurality of panoramic cameras are installed in the real-geographic-space scene in a fixing manner or a stringing manner, and provide marking points in the real-geographic-space scene 102 — by the high-performance computing device, receiving a three-dimensional geographic coordinate of each of the plurality of panoramic cameras in the scene, wherein the three-dimensional geographic coordinate is, by a measuring robot, acquired by using a prism installed at each of the plurality of panoramic cameras and subsequently sent 103 — by the high-performance computing device, receiving external-azimuth parameters from attitude sensors, wherein each of the plurality of panoramic cameras is installed with one of the attitude sensors, and each of the attitude sensors is configured for determining in real time an azimuth angle, a pitch angle and a roll angle of the panoramic camera where the attitude sensor is located, and providing the external-azimuth parameters in photogrammetry, to facilitate subsequent orthographic geometric correction, splicing and optimization of a panoramic image 104 — by the high-performance computing device, receiving a scene environment sound, wherein the scene environment sound is acquired and sent by a plurality of audio collecting devices in the real-geographic-space scene 105 — by the high-performance computing device, according to different installation modes, the image-data sequence, the marking points, the external-azimuth parameters and the three-dimensional geographic coordinates, performing splicing-stitching and the orthographic geometric correction or distortion correction to the image-data sequence, to obtain an orthographic image or a panoramic-image sequence, wherein the different installation modes use different methods of splicing optimization, the orthographic image is obtained by splicing-stitching and orthographic geometric correction to an image sequence obtained in a fixing-type installation mode, and the panoramic-image sequence is obtained by splicing-stitching and distortion correction to an image sequence obtained in a stringing-type installation mode 106 — by the high-performance computing device, performing augmented-reality optimization to the synthesized orthographic image or panoramic-image sequence with the scene environment sound and the three-dimensional geographic coordinates, to obtain a real-geographic-space-scene video streaming having augmented reality, space audios and geographic coordinates located in a geographic-coordinate frame 107 — by the high-performance computing device, sending the real-geographic-space-scene video streaming to an output controlling device, so that the output controlling device displays the real-geographic-space scene in real time, and an operator sends the remote-control instruction by using the output controlling device, to remotely in real time control all or part of the panoramic cameras to shoot or move

FIG. 1

METHOD AND APPARATUS FOR CONSTRUCTING REAL-GEOGRAPHIC-SPACE SCENE IN REAL TIME

CROSS REFERENCE TO THE RELATED APPLICATIONS

This application is based upon and claims priority to Chinese Patent Application No. 202210499659.0, filed on May 9, 2022, the entire contents of which are incorporated herein by reference.

TECHNICAL FIELD

The present disclosure relates to the field of video splicing and spatial scene construction, and particularly relates to a method and apparatus for constructing a real-geographic-space scene in real time based on a panoramic-video technique.

BACKGROUND

Currently, with the continuous progress of the level of the science and technology and the industrial production of human being, the development and utilization of natural resources is continuously up-scaling, which inevitably results in the emergence of some high-risk operation scenes. The high-risk operation scenes usually have situations that are harmful to the human body, such as a closed or half-closed space, narrow entrance and exit, poor natural ventilation, accumulation of toxic, pernicious, inflammable and explosive gases, an insufficient oxygen content, and nuclear radiation, for example, in places such as mines, oil wells, bilge wells, duct trenches, chemical plants and nuclear power stations.

The high-risk scene operation involves diversified fields and industries, and has complicated operation space environments and many dangerous adverse factors, which easily causes safety accidents, to result in serious results. Furthermore, when the operating personnel meet with danger, the rescuing has a high difficulty, and blind rescuing or unsuitable rescuing approaches easily result in up-scaling casualties.

Currently, to solve the above-described problems of the high-risk scene operation, usually a warning system formed by video monitoring in cooperation with various sensor indicators is used for scene monitoring. Such a method can make warning in advance on some of the dangers in the scene to a certain extent. However, it is merely locally visible. Furthermore, the video monitoring does not perform geometric correction and image splicing, which causes that if the observation distance is higher, the deformation is larger, whereby the real-time real situation in the scene is difficult to reproduce, and the operating personnel easily have an erroneous determination on the current situation. Moreover, the video monitoring does not form a real visualized video scene that has three-dimensional geographic coordinates, and the actual production process in the operation scene cannot be accurately analyzed and controlled, whereby, when an accident happens in the high-risk operation scenes, the accident cannot be treated timely and effectively, which cannot excellently satisfy the current requirements on intellectualized operation and no-person operation by the high-risk operation scenes.

SUMMARY

In view of the above problems, the present disclosure provides a method and apparatus for constructing a real-geographic-space scene in real time based on a panoramic-video technique.

An embodiment of the present disclosure provides a method for constructing a real-geographic-space scene in real time based on a panoramic-video technique, where the method for constructing a real-geographic-space scene in real time includes:

by a high-performance computing device, receiving image data collected by a plurality of panoramic cameras, and combining the image data into an image-data sequence, where the plurality of panoramic cameras are controlled by using a remote-control instruction, and the plurality of panoramic cameras are installed in the real-geographic-space scene in a fixing manner or a stringing manner, and provide marking points in the real-geographic-space scene;

by the high-performance computing device, receiving a three-dimensional geographic coordinate of each of the plurality of panoramic cameras in the scene, where the three-dimensional geographic coordinate is, by a measuring robot, acquired by using a prism installed at each of the plurality of panoramic cameras and subsequently sent;

by the high-performance computing device, receiving external-azimuth parameters from attitude sensors, where each of the plurality of panoramic cameras is installed with one of the attitude sensors, each of the attitude sensors is a high-performance three-dimensional-movement-attitude measuring system, and includes auxiliary movement sensors including a three-axis gyroscope, a three-axis accelerometer and a three-axis electronic compass, and each of the attitude sensors is configured for determining in real time an azimuth angle, a pitch angle and a roll angle of the panoramic camera where the attitude sensor is located, and providing the external-azimuth parameters in photogrammetry, to facilitate subsequent orthographic geometric correction, splicing and optimization of a panoramic image;

by the high-performance computing device, receiving a scene environment sound, where the scene environment sound is acquired and sent by a plurality of audio collecting devices in the real-geographic-space scene;

by the high-performance computing device, according to different installation modes, the image-data sequence, the marking points, the external-azimuth parameters and the three-dimensional geographic coordinates, performing splicing-stitching and the orthographic geometric correction or distortion correction to the image-data sequence, to obtain an orthographic image or a panoramic-image sequence, where the different installation modes use different methods of splicing optimization, the orthographic image is obtained by splicing-stitching and orthographic geometric correction to an image sequence obtained in a fixing-type installation mode, and the panoramic-image sequence is obtained by splicing-stitching and distortion correction to an image sequence obtained in a stringing-type installation mode;

by the high-performance computing device, performing augmented-reality optimization to the synthesized orthographic image or panoramic-image sequence with the scene environment sound and the three-dimensional geographic coordinates, to obtain a real-geographic-space-scene video streaming having augmented reality, space audios and geographic coordinates located in a geographic-coordinate frame; and by the high-performance computing device, sending the real-geographic-space-scene video streaming to an output controlling device, so that the output controlling device displays the real-geographic-space scene in real time, and an operator sends the remote-control instruction by using the output controlling device, to remotely in real time control all or part of the panoramic cameras to shoot or move.

Optionally, the marking points include a plurality of first marking points and a plurality of second marking points;

the plurality of panoramic cameras are installed in the real-geographic-space scene in a fixing manner or a stringing manner, and provide marking points in the real-geographic-space scene includes:

if the plurality of panoramic cameras are installed in the real-geographic-space scene in a fixing manner, the plurality of panoramic cameras are installed fixedly and evenly in the real-geographic-space scene, an installation spacing distance is set according to a precision of images collected by the panoramic cameras, while ensuring that a shooting coverage area of each of the panoramic cameras satisfies an application demand of an actual scene, ensuring that a coinciding degree of neighboring images is greater than a threshold, and the plurality of first marking points are individually provided in overlapping view fields of the plurality of panoramic cameras; and if the plurality of panoramic cameras are installed in the real-geographic-space scene in a stringing manner, the plurality of panoramic cameras are installed on a guiding device, the guiding device is divided into a plurality of local line segments, each of the local line segments is installed with at least one of the panoramic cameras, each of the local line segments is capable of independently driving the panoramic camera installed thereon to move, and according to movement speeds and requirement on real-time capabilities of the plurality of panoramic cameras, the plurality of second marking points are provided in the real-geographic-space scene; and each of the local line segments is provided with anticollision rings at two ends, to prevent derailment of the at least one of the panoramic cameras installed on each of the local line segments in movement, and a shooting speed of each of the panoramic cameras matches with a movement speed thereof, to enable a degree of overlapping in the image-data sequence to be sufficient to complete large-range splicing, and to guarantee real-time capabilities of image splicing and fusion in reconstruction of the real-geographic-space scene.

Optionally, the step of, by the high-performance computing device, receiving the image data collected by the plurality of panoramic cameras, and combining the image data into the image-data sequence includes:

according to different installation modes of the plurality of panoramic cameras, using different modes to collect the image data;

if the plurality of panoramic cameras are installed in the fixing manner, according to a demand of a target area, by the high-performance computing device, forwarding the remote-control instruction, controlling the plurality of panoramic cameras to individually collect a real-time panoramic image of the target area, and combining into a real-time-panoramic-image data sequence;

if the plurality of panoramic cameras are installed in the stringing manner, according to a demand of the target area, by the high-performance computing device, forwarding the remote-control instruction, and controlling a movement mode of the plurality of panoramic cameras by using the guiding device, where the movement mode includes that each of the plurality of panoramic cameras moves independently, or that some of the panoramic cameras move synchronously;

if the plurality of panoramic cameras are controlled to move synchronously, by the high-performance computing device, receiving dynamic-image data of the target area and a non-target area that are collected by each of the plurality of panoramic cameras, and combining into a dynamic-image data sequence; and if part of the plurality of panoramic cameras are controlled to move independently, by the high-performance computing device, receiving dynamic-image data of the target area that are collected by the part of the plurality of panoramic cameras, receiving static-image data of the non-target area that are collected by motionless panoramic cameras, and combining into a dynamic-image data sequence.

Optionally, the measuring robot, after acquiring the three-dimensional geographic coordinate of the prism, by using a relative deviation amount between the prism and a lens center of the panoramic camera where the prism is located, determines the three-dimensional geographic coordinate of each of the panoramic cameras; and the three-dimensional geographic coordinate includes a real-time three-dimensional geographic coordinate of each of the plurality of panoramic cameras in movement, and a fixed three-dimensional geographic coordinate of each of the plurality of panoramic cameras when stationary, and the three-dimensional geographic coordinates are used as the external-azimuth parameters required by the photogrammetry, and are used for the subsequent orthographic geometric correction, splicing-stitching and augmented-reality optimization of the images.

Optionally, the high-performance computing device receives external-azimuth parameters from attitude sensors, where each of the panoramic cameras is installed with one of the attitude sensors, each of the attitude sensors is a high-performance three-dimensional-movement-attitude measuring system, and includes auxiliary movement sensors including a three-axis gyroscope, a three-axis accelerometer and a three-axis electronic compass, and each of the attitude sensors is configured for determining in real time an azimuth angle, a pitch angle and a roll angle of the panoramic camera where the attitude sensor is located, and providing the external-azimuth parameters in photogrammetry, to facilitate subsequent orthographic geometric correction, splicing and optimization of a panoramic image.

Optionally, the plurality of audio collecting devices are separately installed in the real-geographic-space scene, and have unique marking numbers, so that the plurality of audio collecting devices collect the scene environment sound of the real-geographic-space scene in a full-covering manner; and each of the plurality of audio collecting devices, when sending the scene environment sound collected thereby, carries the unique marking number thereof, so that subsequently the operator hears the sound by using the output controlling device and senses a position emitting the sound.

Optionally, the step of, by the high-performance computing device, according to the different installation modes, the image-data sequence, the marking points, the external-azimuth parameters and the three-dimensional geographic coordinates, performing splicing-stitching and orthographic geometric correction or distortion correction to the image-data sequence, to obtain an orthographic image or a panoramic-image sequence, where the different installation modes use different methods of splicing optimization includes:
- if the plurality of panoramic cameras are installed in the fixing manner, by the high-performance computing device, receiving the real-time-panoramic-image data sequence, and based on the real-time-panoramic-image data sequence, forming a fixing-type panoramic-video
- by the high-performance computing device, according to a practical demand, by using information of the marking points, a feature-extraction algorithm and a computer-vision method, performing quick feature extraction and matching to the fixing-type panoramic-video sequence;
- by the high-performance computing device, by using a photogrammetric method, spatial positions and attitudes of the plurality of panoramic cameras, and the external-azimuth parameters, by using photogrammetry and a computer-vision technique, performing orthographic correction and image splicing to the fixing-type panoramic-video sequence obtained after the quick feature extraction and matching, to obtain the panoramic orthographic image, where an area of the panoramic orthographic image is greater than an area of the real-time panoramic image;
- if the plurality of panoramic cameras are installed in a stringing manner, by the high-performance computing device, receiving the dynamic-image data sequence, and based on the dynamic-image data sequence, forming a stringing-type panoramic-video sequence;
- by the high-performance computing device, by using a feature-extraction algorithm and by using the marking points, performing quick feature extraction and matching to the stringing-type panoramic-video sequence; and
- by the high-performance computing device, by using a photogrammetric method and the external-azimuth parameters, based on the stringing-type panoramic-video sequence obtained after the quick feature extraction and matching, performing splicing-stitching and distortion correction to the images, to obtain the panoramic-image sequence.

Optionally, the step of, by the high-performance computing device, performing augmented-reality optimization to the synthesized orthographic image or panoramic-image sequence with the scene environment sound and the three-dimensional geographic coordinates, to obtain the real-geographic-space-scene video streaming having augmented reality, space audios and geographic coordinates located in the geographic-coordinate frame includes:
- by the high-performance computing device, based on the panoramic orthographic image, according to the three-dimensional geographic coordinates and the external-azimuth parameters, according to a spatial perspective relation, determining correct placement positions in a real space environment of an object in the target area and an object in the non-target area, and constructing a three-dimensional scene corresponding to the real-geographic-space scene;
- by the high-performance computing device, fusing the scene environment sound into the three-dimensional scene, to obtain the real-geographic-space-scene video streaming having augmented reality, space audios and geographic coordinates located in the geographic-coordinate frame;
- or, by the high-performance computing device, based on the panoramic-video sequence, according to the three-dimensional geographic coordinates and the external-azimuth parameters, according to a spatial perspective relation, determining correct placement positions in a real space environment of an object in the target area and an object in the non-target area, and constructing a three-dimensional scene corresponding to the real-geographic-space scene; and
- by the high-performance computing device, fusing the scene environment sound into the three-dimensional scene, to obtain the real-geographic-space-scene video streaming having augmented reality, space audios and geographic coordinates located in the geographic-coordinate frame.

Optionally, an illuminating device and a dust automatically-washing device are installed on both of two sides of each of the local line segments;
the illuminating device enables an environment within a shooting area of the plurality of panoramic cameras to be clearly visible; and
the dust automatically-washing device enables the plurality of panoramic cameras to individually move smoothly.

Optionally, each of the plurality of panoramic cameras is provided with a remote-control interface, and a fish-eye lens or a reflecting mirror surface or a lens spliced by a plurality of common lenses facing different directions;
the fish-eye lens or the reflecting mirror surface or the lens spliced by a plurality of common lenses facing different directions enables each of the plurality of panoramic cameras to have a panoramic view field of totally 720° in the horizontal direction and the vertical direction, and not have a center blind area; and
the remote-control interface is configured for receiving the remote-control instruction, so that the operator performs remote real-time manipulation to the plurality of panoramic cameras via a wired network or a wireless network, where the wired or wireless network is a 5G network, and the remote-control instruction includes a spatial-pose instruction of adjusting the panoramic cameras according to a shooting demand of the target area, and a shot-image-size instruction.

Optionally, the output controlling device includes an intelligent displaying device or a head-worn VR device;
the head-worn VR device performs automatic augmentation to a viewpoint brightness of a visual region of the operator, and based on the real-geographic-space-scene video streaming, displays attribute information and real-geographic-coordinate information of a target object within the visual region; and
the operator, by using the intelligent displaying device or the head-worn VR device, remotely in real time controls all or some of the panoramic cameras, to shoot any target area, and sends corresponding controlling parameters thereto.

An embodiment of the present disclosure provides an apparatus for constructing a real-geographic-space scene in real time based on a panoramic-video technique, where the apparatus for constructing a real-geographic-space scene is applied in a high-performance computing device, and the high-performance computing device includes:
- an image-data receiving module configured for receiving image data collected by a plurality of panoramic cameras, and combining the image data into an image-data sequence, where the plurality of panoramic cameras are controlled by using a remote-control instruction, and the plurality of panoramic cameras are installed in the real-geographic-space scene in a fixing manner or a stringing manner, and provide marking points in the real-geographic-space scene;

a three-dimensional-geographic-coordinate receiving module configured for receiving a three-dimensional geographic coordinate of each of the plurality of panoramic cameras, where the three-dimensional geographic coordinate is, by a measuring robot, acquired by using a prism installed at each of the plurality of panoramic cameras and subsequently sent;

a panoramic-camera-spatial-attitude receiving module configured for receiving external-azimuth parameters from attitude sensors, where each of the plurality of panoramic cameras is installed with one of the attitude sensors, each of the attitude sensors is a high-performance three-dimensional-movement-attitude measuring system, and includes auxiliary movement sensors including a three-axis gyroscope, a three-axis accelerometer and a three-axis electronic compass, and each of the attitude sensors is configured for determining in real time an azimuth angle, a pitch angle and a roll angle of the panoramic camera where the attitude sensor is located, and providing the external-azimuth parameters in photogrammetry, to facilitate subsequent orthographic geometric correction, splicing and optimization of a panoramic image;

a sound receiving module configured for receiving a scene environment sound, where the scene environment sound is acquired and sent by a plurality of audio collecting devices in the real-geographic-space scene;

a splicing module configured for, according to different installation modes, the image-data sequence, the marking points, the external-azimuth parameters and the three-dimensional geographic coordinates, performing splicing-stitching and orthographic geometric correction or distortion correction to the image-data sequence, to obtain an orthographic image or a panoramic-image sequence, where the different installation modes use different methods of splicing optimization, the orthographic image is obtained by splicing-stitching and orthographic geometric correction to an image sequence obtained in a fixing-type installation mode, and the panoramic-image sequence is obtained by splicing-stitching and distortion correction to an image sequence obtained in a stringing-type installation mode;

an augmented-reality optimizing module configured for performing augmented-reality optimization to the synthesized orthographic image or panoramic-image sequence with the scene environment sound and the three-dimensional geographic coordinates, to obtain a real-geographic-space-scene video streaming having augmented reality, space audios and geographic coordinates located in a geographic-coordinate frame; and a sending module configured for sending the real-geographic-space-scene video streaming to an output controlling device, so that the output controlling device displays the real-geographic-space scene in real time, and an operator sends the remote-control instruction by using the output controlling device, to remotely in real time control all or part of the panoramic cameras to shoot or move.

Optionally, the image-data receiving module is particularly configured for:

according to different installation modes of the plurality of panoramic cameras, using different modes to collect the image data;

if the plurality of panoramic cameras are installed in the fixing manner, according to a demand of a target area, forwarding the remote-control instruction, controlling the plurality of panoramic cameras to individually collect a real-time panoramic image of the target area, and combining into a real-time-panoramic-image data sequence;

if the plurality of panoramic cameras are installed in the stringing manner, according to a demand of the target area, forwarding the remote-control instruction, and controlling a movement mode of the plurality of panoramic cameras by using the guiding device, where the movement mode includes that each of the plurality of panoramic cameras moves independently, or that some of the panoramic cameras move synchronously;

if the plurality of panoramic cameras are controlled to move synchronously, receiving dynamic-image data of the target area and a non-target area that are collected by each of the plurality of panoramic cameras, and combining into a dynamic-image data sequence; and if part of the plurality of panoramic cameras are controlled to move independently, receiving dynamic-image data of the target area that are collected by the part of the plurality of panoramic cameras, receiving static-image data of the non-target area that are collected by motionless panoramic cameras, and combining into a dynamic-image data sequence.

Optionally, the splicing module is particularly configured for:

if the plurality of panoramic cameras are installed in the fixing manner, receiving the real-time-panoramic-image data sequence, and based on the real-time-panoramic-image data sequence, forming a fixing-type panoramic-video sequence;

according to a practical demand, by using information of the marking points, a feature-extraction algorithm and a computer-vision method, performing quick feature extraction and matching to the fixing-type panoramic-video sequence;

by using a photogrammetric method, spatial positions and attitudes of the plurality of panoramic cameras, and the external-azimuth parameters, by using photogrammetry and a computer-vision technique, performing orthographic correction and image splicing to the fixing-type panoramic-video sequence obtained after the quick feature extraction and matching, to obtain the panoramic orthographic image, where an area of the panoramic orthographic image is greater than an area of the real-time panoramic image;

if the plurality of panoramic cameras are installed in a stringing manner, receiving the dynamic-image data sequence, and based on the dynamic-image data sequence, forming a stringing-type panoramic-video sequence;

by using a feature-extraction algorithm and by using the marking points, performing quick feature extraction and matching to the stringing-type panoramic-video sequence; and by using a photogrammetric method and the external-azimuth parameters, based on the stringing-type panoramic-video sequence obtained after the quick feature extraction and matching, performing splicing-stitching and distortion correction to the images, to obtain the panoramic-image sequence.

Optionally, the augmented-reality optimizing module is particularly configured for:

based on the panoramic orthographic image, according to the three-dimensional geographic coordinates and the external-azimuth parameters, according to a spatial perspective relation, determining correct placement positions in a real space environment of an object in the target area and an object in the non-target area, and constructing a three-dimensional scene corresponding to the real-geographic-space scene;

fusing the scene environment sound into the three-dimensional scene, to obtain the real-geographic-space-scene video streaming having augmented reality, space audios and geographic coordinates located in the geographic-coordinate frame;

or, based on the panoramic-video sequence, according to the three-dimensional geographic coordinates and the external-azimuth parameters, according to a spatial perspective relation, determining correct placement positions in a real space environment of an object in the target area and an object in the non-target area, and constructing a three-dimensional scene corresponding to the real-geographic-space scene; and fusing the scene environment sound into the three-dimensional scene, to obtain the real-geographic-space-scene video streaming having augmented reality, space audios and geographic coordinates located in the geographic-coordinate frame.

The method for constructing a real-geographic-space scene in real time based on a panoramic-video technique according to the present disclosure includes: receiving image data collected by a plurality of panoramic cameras, and combining the image data into an image-data sequence; receiving the three-dimensional geographic coordinate, the spatial attitude and the scene environment sound of each of the panoramic cameras; according to the image data, the three-dimensional geographic coordinates and the spatial attitudes, performing splicing-stitching and geometric correction or distortion correction to the image-data sequence; performing augmented-reality optimization to the synthesized orthographic image or panoramic-image sequence with the scene environment sound and the three-dimensional geographic coordinates, to obtain a real-geographic-space-scene video streaming having augmented reality, space audios and geographic coordinates located in a geographic-coordinate frame; and sending the real-geographic-space-scene video streaming to an output controlling device, so that the output controlling device displays the optimum real-geographic-space scene in real time, and whereby the operator, by using the output controlling device, remotely in real time controls all or part of the panoramic cameras to move.

The present disclosure, mainly by inputting and outputting video images, audios, the real geographic coordinates and the spatial attitudes of the cameras, in cooperation with the corresponding hardware devices and software algorithms, realizes the construction of the spatial scene at any location far from the current scene, to enable the operator to have the feeling of "being personally on the scene", which is similar to the situation when he is really in the operation site. Therefore, the operator may have a clear and accurate decision on the field situation in production or when an accident happens. By, on that basis, continuously developing the remote controlling and communication technique, people cannot only indirectly observe the current operation scene, but also can control the relevant processes of the operation of the production scene in real time at any location, thereby realizing fewer-person operation or even no-person operation at high-risk operation sites, which, while sufficiently ensuring the safety of the remote operator, further increases the production operation efficiency. The present disclosure excellently satisfies the current requirements on intellectualized operation and no-person operation by high-risk operation scenes.

BRIEF DESCRIPTION OF THE DRAWINGS

By reading the following detailed description of the preferable embodiments, various other advantages and benefits will become clear to a person skilled in the art. The drawings are merely intended to show the preferable embodiments, and are not to be considered as limiting the present disclosure. Furthermore, throughout the drawings, the same reference signs denote the same elements. In the drawings:

FIG. 1 is a flow chart of a method for constructing a real-geographic-space scene in real time based on a panoramic-video technique according to an embodiment of the present disclosure;

DETAILED DESCRIPTION OF THE EMBODIMENTS

In order to make the above purposes, features and advantages of the present disclosure more apparent and understandable, the present disclosure will be described in further detail below with reference to the drawings and the particular embodiments. It should be understood that the particular embodiments described herein are merely intended to interpret the present disclosure, and are merely some embodiments of the present disclosure, rather than all of the embodiments, and they are not intended to limit the present disclosure.

Referring to FIG. 1, FIG. 1 shows a flow chart of a method for constructing a real-geographic-space scene in real time based on a panoramic-video technique according to an embodiment of the present disclosure. Taking the stringing-type installing method as an example, the method includes:

Step 101: by a high-performance computing device, receiving image data collected by a plurality of panoramic cameras, and combining the image data into an image-data sequence, where the plurality of panoramic cameras are controlled by using a remote-control instruction, and the plurality of panoramic cameras are installed in the real-geographic-space scene in a fixing manner or a stringing manner, and provide marking points in the real-geographic-space scene.

In an embodiment of the present disclosure, in order to realize the panoramic reproduction of the real-geographic-space scene, and by taking into consideration the restriction by the shooting area of the panoramic cameras, it is required to arrange the plurality of panoramic cameras according to the factors such as the size and the location of the real-geographic-space scene.

In an embodiment of the present disclosure, taking the case as an example in which the installation mode of the plurality of panoramic cameras is the stringing type, they are installed on a guiding device, the guiding device is divided into a plurality of local line segments, and each of the local line segments is installed with at least one of the panoramic cameras, among them, how many panoramic cameras are installed is determined particularly according to practical demands. The panoramic cameras at each of the local line segments are capable of independently and quickly moving. The guiding device is designed to enable the panoramic cameras to freely move, and may be implemented by using structures including but not limited to the stringing type or the guide-rail type.

Figure 2:
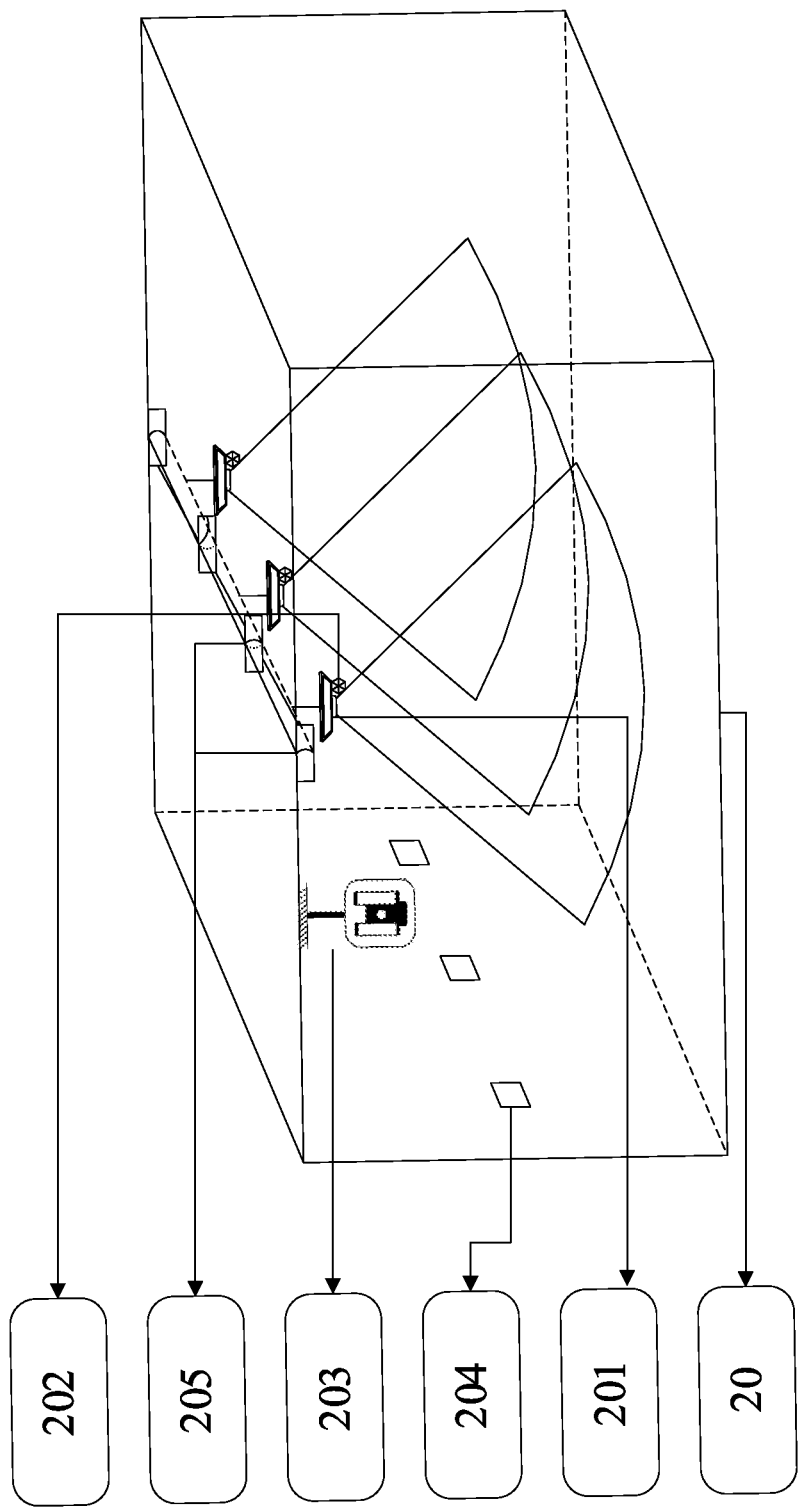
FIG. 2 is a schematic diagram of the stringing-type arrangement of the panoramic cameras according to an embodiment of the present disclosure.

For example, taking the stringing-type arrangement as an example, FIG. 2 shows a schematic diagram of the stringing-type arrangement of the panoramic cameras. The stringing in FIG. 2 is illustratively and simply shown, by taking the case as an example in which the guiding device is divided into 3 local line segments and each of the local line segments is installed with one panoramic camera 201. Each of the panoramic cameras is installed with one prism 202. Because it is illustratively shown, the entire real-geographic-space scene 20 may employ one measuring robot 203 to realize the measurement on the real geographic coordinate. In practical applications, the quantity of the measuring robot 203 may be determined according to the size of the real-geographic-space scene 20.

It should be noted that the image splicing and processing and the processing of various data may be performed by using a high-performance computing device, and the high-performance computing device receives all of the data and processes. After the processing is completed, the obtained video streaming of the optimum real-geographic-space scene is sent to the output controlling device, and the high-performance computing device receives the remote-control instruction sent by the output controlling device, and subsequently forwards to the corresponding guiding device or panoramic camera at the same time.

In order to ensure the accuracy of the subsequent image splicing, marking points are required to be provided. Taking the provision mode of 3 marking points 204 shown in FIG. 2 as an example, in the stringing-type installing method, the second marking points 204 are arranged evenly in the real spatial scene, where their installation spacing is set according to the movement speeds and the real-time capabilities demand of the panoramic cameras. The second marking points 204 are used to splice the panoramic images collected by the same panoramic camera at different moments during the movement or by different panoramic cameras at the same moment during the movement. If the panoramic cameras have high movement speeds or have a high requirement on the real-time capabilities, then the second marking points 204 have a low installation spacing. If the panoramic cameras have low movement speeds or have a low requirement on the real-time capabilities, then the second marking points 204 have a high installation spacing.

Figure 3:
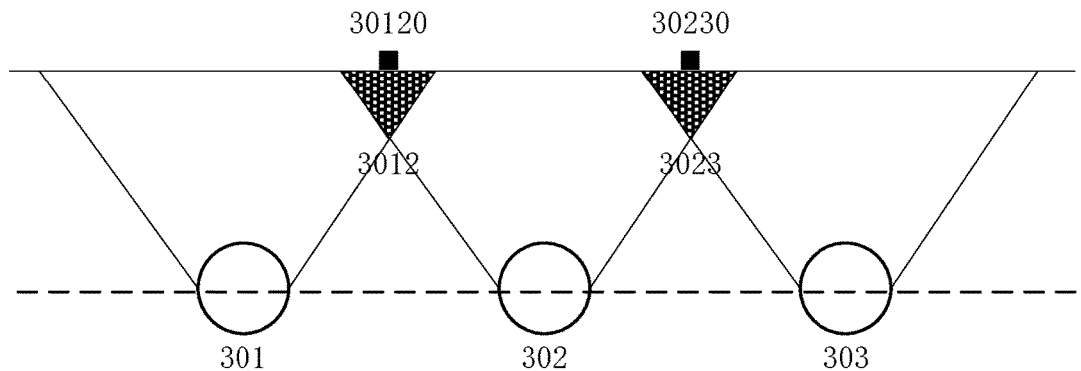
FIG. 3 is a schematic top view of the arrangement of the plurality of panoramic cameras and the corresponding marking points according to an embodiment of the present disclosure.

In the fixing-type installing method, the shooting coverage area of the plurality of panoramic cameras is not only required to satisfy the application demand of the real-geographic-space scene, but also is required to ensure that the coinciding degrees between the neighboring images are greater than a preset threshold. First marking points are provided in the overlapping view fields between every two of the panoramic cameras. Particularly, referring to FIG. 3, a shooting overlapping region 3012 is between the panoramic cameras 301, 302, a shooting overlapping region 3023 is between the panoramic cameras 302, 303, and the shooting overlapping regions of more panoramic cameras may be configured in the same manner, which is not discussed further herein. Two marking points 30120, 30230 are provided in the shooting overlapping regions 3012, 3023.

Furthermore, in the stringing-type installing method, each of the local line segments are provided with anticollision rings 205 at the two ends, to prevent derailment of the panoramic cameras 201 installed on each of the local line segments in movement, and the shooting speed of each of the panoramic cameras 201 matches with the movement speed thereof, to enable the degree of overlapping in the image-data sequence to be sufficient to complete large-range splicing, and to guarantee the real-time capabilities of the image splicing and fusion in the reconstruction of the real-geographic-space scene.

Likewise, regarding the fixing type, if the plurality of panoramic cameras are installed in the real-geographic-space scene in a fixing manner, the plurality of panoramic cameras are installed fixedly and evenly in the real-geographic-space scene, the installation spacing distance is set according to the precision of the images collected by the panoramic cameras, while ensuring that the shooting coverage area of each of the panoramic cameras satisfies the application demand of an actual scene, it is ensured that the coinciding degree of the neighboring images is greater than a threshold, and a plurality of marking points are individually provided in the overlapping view fields of the plurality of panoramic cameras. The fixing-type installation may be understood as a special stringing-type installation, is slightly different in the collection and splicing of the image data, and may refer to the mode of the stringing-type installation, which is not discussed further herein.

In an embodiment of the present disclosure, the plurality of panoramic cameras are controlled by using a remote-control instruction, and the remote-control instruction is generated by the operator by using the output controlling device and is forwarded by the high-performance computing device. Likewise, because the movement of the panoramic cameras is realized by using the guiding device, the movement mode of the guiding device decides the movement mode of the panoramic cameras, the movement speed of the guiding device is the movement speed of the panoramic cameras, and the movement mode and the speed of the guiding device is controlled by the remote-control instruction that is generated by the operator by using the output controlling device and forwarded by the high-performance computing device. The difference is that each of the guiding device and the panoramic cameras is installed with the remote-control interface, the remote-control instruction received by the guiding device is to control the movement mode and the speed of the guiding device, and the remote-control instructions received by the panoramic cameras are a spatial-pose instruction of adjusting the panoramic cameras according to the shooting demand of the target area, and a shot-image-size instruction.

In such a manner, the independent movements of each of the panoramic cameras or the synchronous movement of some of the panoramic cameras may be realized. Certainly, it can be understood that the synchronous movement of all of the panoramic cameras may also be realized. Which movement mode is to be used is decided according to demands on the shot target area. If the panoramic cameras are controlled to move synchronously, then the high-performance computing device receives the dynamic-image data of the target area and a non-target area that are collected by each of the panoramic cameras. If some of the panoramic cameras are controlled to move independently, then the high-performance computing device receives the dynamic-image data of the target area that are collected by the part of the panoramic cameras, and receives static-image data of the non-target area that are collected by motionless panoramic cameras. The shooting by each of the panoramic cameras in the independent-movement manner facilitates the tracking and the real-time scene detection on a smaller target area or a single target object. The synchronous movement of part or all of the panoramic cameras facilitates the construction of a larger target area and the entire real-geographic-space scene.

In addition, considering the brightness demand and the movement smoothness, an illuminating device and a dust automatically-washing device are installed on both of the two sides of each of the local line segments. The illuminating device may generate sufficient illumination, to enable the environment within the shooting area of the plurality of panoramic cameras to be clearly visible. The dust automatically-washing device may automatically wash dust, to enable the plurality of panoramic cameras to individually move smoothly.

Taking into consideration that the current panoramic cameras have various types, and all of the panoramic cameras cannot satisfy the demand, then each of the panoramic cameras, besides the remote-control interface, may further be provided with a fish-eye lens, or a reflecting mirror surface (for example, a parabolic or hyperbolic mirror surface), or a lens spliced by a plurality of common lenses facing different directions, whereby each of the panoramic cameras has a panoramic view field of totally 720° in the horizontal direction and the vertical direction, and not have a center blind area, which facilitates the subsequent construction of the three-dimensional scene.

If the plurality of panoramic cameras are installed in the fixing manner, according to the demand of a target area, the high-performance computing device forwards the remote-control instruction, controls the plurality of panoramic cameras to individually collect a real-time panoramic image of the target area, and combines into a real-time-panoramic-image data sequence.

If the plurality of panoramic cameras are installed in the stringing manner, according to the demand of the target area, the high-performance computing device forwards the remote-control instruction, and controls a movement mode of the plurality of panoramic cameras by using the guiding device, where the movement mode includes that each of the panoramic cameras moves independently, or that part of the panoramic cameras move synchronously.

If the panoramic cameras are controlled to move synchronously, the high-performance computing device receives the dynamic-image data of the target area and a non-target area that are collected by each of the panoramic cameras, and combines into a dynamic-image data sequence.

If some of the panoramic cameras are controlled to move independently, the high-performance computing device receives the dynamic-image data of the target area that are collected by the some of the panoramic cameras, receives the static-image data of the non-target area that are collected by motionless panoramic cameras, and combines into a dynamic-image data sequence.

Step 102: by the high-performance computing device, receiving a three-dimensional geographic coordinate of each of the plurality of panoramic cameras in the scene, where the three-dimensional geographic coordinate is, by a measuring robot, acquired by using a prism installed at each of the plurality of panoramic cameras and subsequently sent.

In an embodiment of the present disclosure, in order to obtain the real geographic coordinate of each of the panoramic cameras, it is required to use a measuring robot and a prism. The measuring robot is a precise instrument for automatically locating a target prism, the core components of the measuring robot include a gyroscopic north seeker and a smart total station, the gyroscopic north seeker performs north seeking to complete locating of the measuring robot, and the measuring robot, on the basis that the locating is completed, by automatically identifying and tracking the target prism, measures the horizontal angle, the vertical angle and the three-dimensional distance between the smart total station and the target prism at the same time, and outputs the three-dimensional geographic coordinate of the target prism in real time. The precision can usually reach the millimeter level.

The prism installed at each of the panoramic cameras accurately determines the relative deviation amount between the prism and the lens center of the panoramic camera where it is located. The measuring robot, after acquiring the three-dimensional geographic coordinate of the prism, by using the relative deviation amount between the prism and the lens center of the panoramic camera where the prism is located, determines the three-dimensional geographic coordinate of each of the panoramic cameras, which is subsequently sent by the measuring robot to the high-performance computing device. The three-dimensional geographic coordinate includes a real-time three-dimensional geographic coordinate of each of the panoramic cameras in movement, and a fixed three-dimensional geographic coordinate of each of the panoramic cameras when stationary, and the three-dimensional geographic coordinates are used as the external-azimuth parameters required by the photogrammetry, and are used for the subsequent splicing-stitching and augmented-reality optimization of the images by the high-performance computing device.

Step 103: by the high-performance computing device, receiving external-azimuth parameters from attitude sensors, where each of the panoramic cameras is installed with one of the attitude sensors, each of the attitude sensors is a high-performance three-dimensional-movement-attitude measuring system, and includes auxiliary movement sensors including a three-axis gyroscope, a three-axis accelerometer and a three-axis electronic compass, and each of the attitude sensors is configured for determining in real time an azimuth angle, a pitch angle and a roll angle of the panoramic camera where the attitude sensor is located, and providing the external-azimuth parameters in photogrammetry, to facilitate subsequent orthographic geometric correction, splicing and optimization of a panoramic image.

In an embodiment of the present disclosure, in order to construct a three-dimensional scene that corresponds to the real-geographic-space scene, each of the panoramic cameras is installed with one of the attitude sensors, each of the attitude sensors is a high-performance three-dimensional-movement-attitude measuring system, and includes auxiliary movement sensors including a three-axis gyroscope, a three-axis accelerometer and a three-axis electronic compass, and each of the attitude sensors is configured for determining in real time the azimuth angle, the pitch angle and the roll angle of the panoramic camera where the attitude sensor is located, and providing the external-azimuth parameters in photogrammetry, to facilitate subsequent correction, splicing and optimization of a panoramic image.

Step 104: by the high-performance computing device, receiving a scene environment sound, where the scene environment sound is acquired and sent by a plurality of audio collecting devices in the real-geographic-space scene.

In an embodiment of the present disclosure, in order to further enhance the feeling of "being personally on the scene", audio collecting devices are separately installed in the real-geographic-space scene, for example, microphones. Each of the audio collecting devices has a unique marking number, so that the plurality of audio collecting devices collect the scene environment sound of the real-geographic-space scene in a full-covering manner. Each of the plurality of audio collecting devices, when sending the scene environment sound collected thereby to the high-performance computing device, carries the unique marking number thereof, whereby subsequently the operator hears the sound by using the output controlling device and senses the position emitting the sound.

Step 105: by the high-performance computing device, according to different installation modes, the image-data sequence, the marking points, the external-azimuth parameters and the three-dimensional geographic coordinates, performing splicing-stitching and the orthographic geometric correction or distortion correction to the image-data sequence, to obtain an orthographic image or a panoramic-image sequence, where the different installation modes use different methods of splicing optimization, the orthographic image is obtained by splicing-stitching and orthographic geometric correction to an image sequence obtained in a fixing-type installation mode, and the panoramic-image sequence is obtained by splicing-stitching and distortion correction to an image sequence obtained in a stringing-type installation mode.

If the remote-control instruction forwarded by the high-performance computing device is to control each of the panoramic cameras that are installed in the fixing manner to shoot the target area, then the high-performance computing device receives the real-time-panoramic-image data sequence within the target area and the non-target area, and subsequently forms the fixing-type panoramic-video sequence based on the real-time-panoramic-image data sequence; by using a feature-extraction algorithm and by using the marking points, performs quick feature extraction and matching to the fixing-type panoramic-video sequence; and subsequently, by using a photogrammetric method and the external-azimuth parameters, based on the fixing-type panoramic-video sequence obtained after the quick feature extraction and matching, performs splicing-stitching and orthographic geometric correction of the images. Accordingly, a panoramic orthographic image can be obtained, where the area of the panoramic orthographic image is greater than the area of the real-time panoramic image.

If the remote-control instruction forwarded by the high-performance computing device is to control the panoramic cameras that are installed in the stringing manner to shoot the target area, then the high-performance computing device receives a dynamic-image data sequence, and based on the dynamic-image data sequence, forms a stringing-type panoramic-video sequence; by using a feature-extraction algorithm and by using the marking points, performs quick feature extraction and matching to the stringing-type panoramic-video sequence; and subsequently, by using a photogrammetric method and the external-azimuth parameters, based on the stringing-type panoramic-video sequence obtained after the quick feature extraction and matching, performs splicing-stitching and distortion correction to the images, to obtain the panoramic-image sequence.

Step 106: by the high-performance computing device, performing augmented-reality optimization to the synthesized orthographic image or panoramic-image sequence with the scene environment sound and the three-dimensional geographic coordinates, to obtain a real-geographic-space-scene video streaming having augmented reality, space audios and geographic coordinates located in a geographic-coordinate frame.

In an embodiment of the present disclosure, regarding the fixing-type installation mode, the high-performance computing device, based on the panoramic orthographic image, according to the three-dimensional geographic coordinates and the external-azimuth parameters, according to a spatial perspective relation, determines correct placement positions in a real space environment of an object in the target area and an object in the non-target area, and constructs a three-dimensional scene corresponding to the real-geographic-space scene; and finally, fuses the scene environment sound into the three-dimensional scene, to obtain the real-geographic-space-scene video streaming having augmented reality, space audios and geographic coordinates located in the geographic-coordinate frame.

Alternatively, regarding the stringing-type installation mode, the high-performance computing device, based on the panoramic-video sequence, according to the three-dimensional geographic coordinates and the external-azimuth parameters, according to a spatial perspective relation, determines correct placement positions in a real space environment of an object in the target area and an object in the non-target area, and constructs a three-dimensional scene corresponding to the real-geographic-space scene; and finally, fuses the scene environment sound into the three-dimensional scene, to obtain the real-geographic-space-scene video streaming having augmented reality, space audios and geographic coordinates located in the geographic-coordinate frame.

It should be noted that, because the audio collecting devices are separately arranged in the real-geographic-space scene, the audio collecting devices are substantially objects within the target area and the non-target area. Therefore, the real geographic coordinates of the audio collecting devices are also determined. Subsequently, by using the unique marking numbers of the audio collecting devices, the optimum three-dimensional scene can have space audios, whereby the operator can hear the sound in the output controlling device and sense the position of the sound.

In an embodiment of the present disclosure, the data such as the panoramic images collected by the panoramic cameras, the environment sounds collected by the audio collecting devices and the three-dimensional geographic coordinates collected by the measuring robot may be transmitted in a wired or wireless manner into and saved in the high-performance computing device, where the wired or wireless network may be but is not limited to a 5G network. The particular data transmission may use a mobile communication network as the primary transmission path and an optical-fiber channel as an auxiliary transmission path. The data transmission sufficiently utilizes the advantages of the mobile communication network of quicker and more convenient deployment. However, when in the real-geographic-space scene the mobile-communication transmission signals have a poor quality, the optical-fiber data transmission may be switched and used, and the optical-fiber data transmission is more stable.

Step 107: by the high-performance computing device, sending the real-geographic-space-scene video streaming to an output controlling device, so that the output controlling device displays the real-geographic-space scene in real time, and an operator sends the remote-control instruction by using the output controlling device, to remotely in real time control all or part of the panoramic cameras to shoot or move.

In an embodiment of the present disclosure, after the preceding steps 101-106 are completed, the real-geographic-space-scene video streaming that reflects the real-geographic-space scene may be obtained. Based on the real-geographic-space-scene video streaming, in order to facilitate the remote controlling by the operator, the high-performance computing device is further required to send the real-geographic-space-scene video streaming to the output controlling device, whereby the output controlling device displays the real-geographic-space-scene video streaming in real time, to reach the feeling of "being personally on the scene", and whereby an operator sends the remote-control instruction by using the output controlling device, to remotely in real time control all or some of the panoramic cameras to move.

In an embodiment of the present disclosure, the output controlling device includes an intelligent displaying device or a head-worn VR device. The head-worn VR device is currently a relatively new high-tech product, and has a better function of virtual reality than other devices. It may perform automatic augmentation to the viewpoint brightness of the visual region of the operator, and, based on the optimum three-dimensional scene, display attribute information and real-geographic-coordinate information of a target object within the visual region.

Certainly, the operator may, by using the intelligent displaying device or the head-worn VR device, remotely in real time control all or some of the panoramic cameras, to shoot any target area, and send corresponding controlling parameters thereto, to control the poses of the panoramic cameras and control the sizes of the image shot by the panoramic cameras. As stated above, the operator may also, by using the intelligent displaying device or the head-worn VR device, remotely in real time control the movement mode and the speed of the stringing-type guiding device (for example, the function of automatic cruising, whereby the panoramic cameras move at a particular speed), to better and more conveniently control the panoramic cameras to complete the required shooting of the target area.

Figure 4:
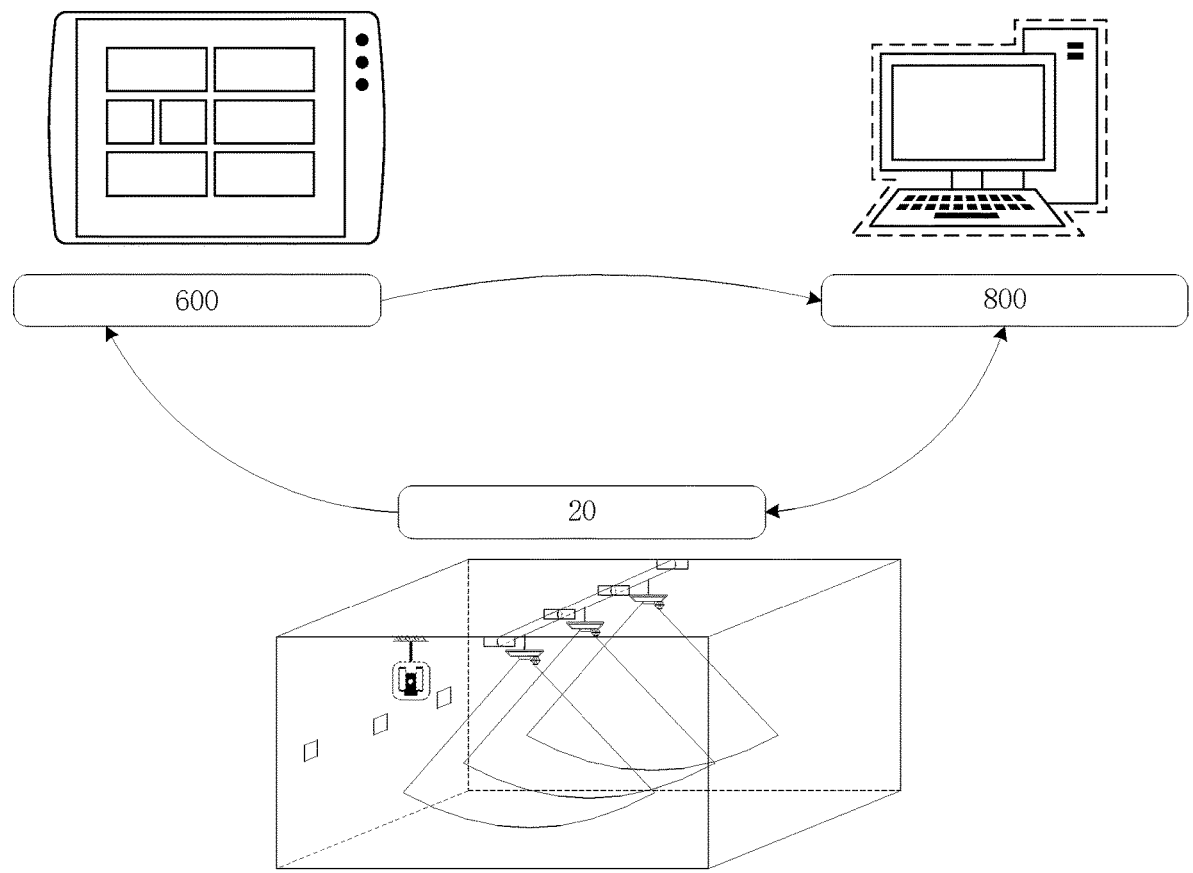
FIG. 4 is a schematic diagram of the communicative connection of a method for constructing a real-geographic-space scene in real time based on a panoramic-video technique according to an embodiment of the present disclosure.

In an embodiment of the present disclosure, a schematic diagram of the communicative connection of the method for constructing a real-geographic-space scene in real time based on a panoramic-video technique may refer to FIG. 4, which includes the high-performance computing device 600, the output controlling device 800 and the real-geographic-space scene 20, which jointly implement the method for constructing a real-geographic-space scene in real time based on a panoramic-video technique.

Figure 5:
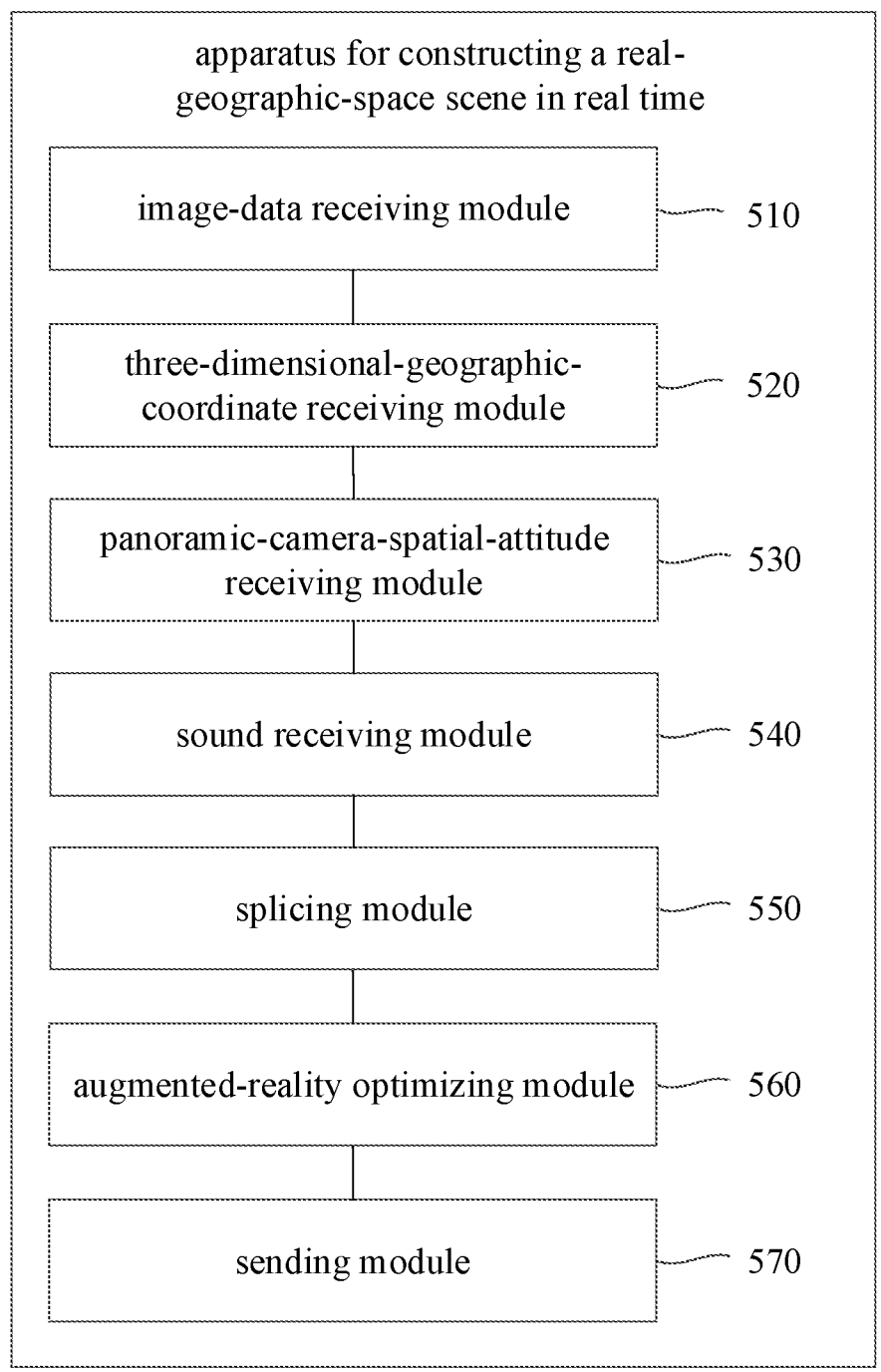
FIG. 5 is a block diagram of an apparatus for constructing a real-geographic-space scene in real time based on a panoramic-video technique according to an embodiment of the present disclosure.

In an embodiment of the present disclosure, based on the above-described method for constructing a real-geographic-space scene in real time based on a panoramic-video technique, there is further provided an apparatus for constructing a real-geographic-space scene in real time based on a panoramic-video technique. Referring to FIG. 5, FIG. 5 shows a block diagram of an apparatus for constructing a real-geographic-space scene in real time based on a panoramic-video technique according to an embodiment of the present disclosure. The apparatus for constructing a real-geographic-space scene is applied in a high-performance computing device, and the high-performance computing device includes:

an image-data receiving module 510 configured for receiving image data collected by a plurality of panoramic cameras, and combining the image data into an image-data sequence, where the plurality of panoramic cameras are controlled by using a remote-control instruction, and the plurality of panoramic cameras are installed in the real-geographic-space scene in a fixing manner or a stringing manner, and provide marking points in the real-geographic-space scene;

a three-dimensional-geographic-coordinate receiving module 520 configured for receiving a three-dimensional geographic coordinate of each of the panoramic cameras, where the three-dimensional geographic coordinate is, by a measuring robot, acquired by using a prism installed at each of the panoramic cameras and subsequently sent, where the measuring robot is a precise instrument for automatically locating a target prism, the core components of the measuring robot includes a gyroscopic north seeker and a smart total station, the gyroscopic north seeker performs north seeking to complete locating of the measuring robot, and the smart total station, on the basis that the locating is completed, by automatically identifying and tracking the target prism, measures a horizontal angle, a vertical angle and a three-dimensional distance between the smart total station and the target prism at the same time, and outputs the three-dimensional geographic coordinate of the target prism in real time;

a panoramic-camera-spatial-attitude receiving module 530 configured for receiving external-azimuth parameters from attitude sensors, where each of the panoramic cameras is installed with one of the attitude sensors, each of the attitude sensors is a high-performance three-dimensional-movement-attitude measuring system, and includes auxiliary movement sensors including a three-axis gyroscope, a three-axis accelerometer and a three-axis electronic compass, and each of the attitude sensors is configured for determining in real time an azimuth angle, a pitch angle and a roll angle of the panoramic camera where the attitude sensor is located, and providing the external-azimuth parameters in photogrammetry, to facilitate subsequent orthographic geometric correction, splicing and optimization of a panoramic image;

a sound receiving module 540 configured for receiving a scene environment sound, where the scene environment sound is acquired and sent by a plurality of audio collecting devices in the real-geographic-space scene;

a splicing module 550 configured for, according to different installation modes, the image-data sequence, the marking points, the external-azimuth parameters and the three-dimensional geographic coordinates, performing splicing-stitching and orthographic geometric correction or distortion correction to the image-data sequence, to obtain an orthographic image or a panoramic-image sequence, where the different installation modes use different methods of splicing optimization, the orthographic image is obtained by splicing-stitching and orthographic geometric correction to an image sequence obtained in a fixing-type installation mode, and the panoramic-image sequence is obtained by splicing-stitching and distortion correction to an image sequence obtained in a stringing-type installation mode;

an augmented-reality optimizing module 560 configured for performing augmented-reality optimization to the synthesized orthographic image or panoramic-image sequence with the scene environment sound and the three-dimensional geographic coordinates, to obtain a real-geographic-space-scene video streaming having augmented reality, space audios and geographic coordinates located in a geographic-coordinate frame; and a sending module 570 configured for sending the real-geographic-space-scene video streaming to an output controlling device, so that the output controlling device displays the real-geographic-space scene in real time, and an operator sends the remote-control instruction by using the output controlling device, to remotely in real time control all or part of the panoramic cameras to shoot or move.

Optionally, the image-data receiving module 510 is particularly configured for:

according to different installation modes of the plurality of panoramic cameras, using different modes to collect the image data;

if the plurality of panoramic cameras are installed in the fixing manner, according to a demand of a target area, forwarding the remote-control instruction, controlling the plurality of panoramic cameras to individually collect a real-time panoramic image of the target area, and combining into a real-time-panoramic-image data sequence;

if the plurality of panoramic cameras are installed in the stringing manner, according to a demand of the target area, forwarding the remote-control instruction, and controlling a movement mode of the plurality of panoramic cameras by using the guiding device, where the movement mode includes that each of the panoramic cameras moves independently, or that some of the panoramic cameras move synchronously;

if the panoramic cameras are controlled to move synchronously, receiving dynamic-image data of the target area and a non-target area that are collected by each of the panoramic cameras, and combining into a dynamic-image data sequence; and if part of the panoramic cameras are controlled to move independently, receiving dynamic-image data of the target area that are collected by the part of the panoramic cameras, receiving static-image data of the non-target area that are collected by motionless panoramic cameras, and combining into a dynamic-image data sequence.

Optionally, each of the panoramic cameras is installed with one of the attitude sensors, each of the attitude sensors is a high-performance three-dimensional-movement-attitude measuring system, and includes auxiliary movement sensors including a three-axis gyroscope, a three-axis accelerometer and a three-axis electronic compass, and each of the attitude sensors is configured for determining in real time an azimuth angle, a pitch angle and a roll angle of the panoramic camera where the attitude sensor is located, and providing the external-azimuth parameters in photogrammetry, to facilitate subsequent correction, splicing and optimization of a panoramic image;

the splicing module 550 is particularly configured for:

if the plurality of panoramic cameras are installed in the fixing manner, receiving the real-time-panoramic-image data sequence, and based on the real-time-panoramic-image data sequence, forming a fixing-type panoramic-video sequence;

according to a practical demand, by using information of the marking points, a feature-extraction algorithm and a computer-vision method, performing quick feature extraction and matching to the fixing-type panoramic-video sequence;

by using a photogrammetric method, spatial positions and attitudes of the plurality of panoramic cameras, and the external-azimuth parameters, by using photogrammetry and a computer-vision technique, performing orthographic correction and image splicing to the fixing-type panoramic-video sequence obtained after the quick feature extraction and matching, to obtain the panoramic orthographic image, where an area of the panoramic orthographic image is greater than an area of the real-time panoramic image;

if the plurality of panoramic cameras are installed in a stringing manner, receiving the dynamic-image data sequence, and based on the dynamic-image data sequence, forming a stringing-type panoramic-video sequence;

by using a feature-extraction algorithm and by using the marking points, performing quick feature extraction and matching to the stringing-type panoramic-video sequence; and by using a photogrammetric method and the external-azimuth parameters, based on the stringing-type panoramic-video sequence obtained after the quick feature extraction and matching, performing splicing-stitching and distortion correction to the images, to obtain the panoramic-image sequence.

Optionally, the augmented-reality optimizing module 560 is particularly configured for:

based on the panoramic orthographic image, according to the three-dimensional geographic coordinates and the external-azimuth parameters, according to a spatial perspective relation, determining correct placement positions in a real space environment of an object in the target area and an object in the non-target area, and constructing a three-dimensional scene corresponding to the real-geographic-space scene;

fusing the scene environment sound into the three-dimensional scene, to obtain the real-geographic-space-scene video streaming having augmented reality, space audios and geographic coordinates located in the geographic-coordinate frame;

or, based on the panoramic-video sequence, according to the three-dimensional geographic coordinates and the external-azimuth parameters, according to a spatial perspective relation, determining correct placement positions in a real space environment of an object in the target area and an object in the non-target area, and constructing a three-dimensional scene corresponding to the real-geographic-space scene; and fusing the scene environment sound into the three-dimensional scene, to obtain the real-geographic-space-scene video streaming having augmented reality, space audios and geographic coordinates located in the geographic-coordinate frame.

In conclusion, the method for constructing a real-geographic-space scene in real time based on a panoramic-video technique according to the present disclosure includes, receiving image data collected by a plurality of panoramic cameras, and combining the image data into an image-data sequence; receiving the three-dimensional geographic coordinate, the spatial attitude and the scene environment sound of each of the panoramic cameras; according to the image data, the three-dimensional geographic coordinates and the spatial attitudes, performing splicing-stitching and geometric correction or distortion correction to the image-data sequence; performing augmented-reality optimization to the synthesized orthographic image or panoramic-image sequence with the scene environment sound and the three-dimensional geographic coordinates, to obtain a real-geographic-space-scene video streaming having augmented reality, space audios and geographic coordinates located in a geographic-coordinate frame; and sending the real-geographic-space-scene video streaming to an output controlling device, so that the output controlling device displays the optimum real-geographic-space scene in real time, and whereby the operator, by using the output controlling device, remotely in real time controls all or part of the panoramic cameras to move.

The present disclosure, mainly by inputting and outputting video images, audios and the real geographic coordinates, in cooperation with the corresponding hardware devices and software algorithms, realizes the construction of the spatial scene at any location far from the current scene, to enable the operator to have the feeling of "being personally on the scene", which is similar to the situation when he is really in the operation site. Therefore, the operator can have a clear and accurate decision on the field situation in production or when an accident happens. By, on that basis, continuously developing the remote controlling and communication technique, people cannot only indirectly observe the current operation scene, but also can control the relevant processes of the operation of the production scene in real time at any location, thereby realizing fewer-person operation or even no-person operation at high-risk operation sites, which, while sufficiently ensuring the safety of the remote operator, further increases the production operation efficiency. The present disclosure excellently satisfies the current requirements on intellectualized operation and no-person operation by high-risk operation scenes.

Although preferable embodiments of the embodiments of the present disclosure have been described, once a person skilled in the art has known the essential inventive concept, he may make further variations and modifications on those embodiments. Therefore, the appended claims are intended to be interpreted as including the preferable embodiments and all of the variations and modifications that fall within the scope of the embodiments of the present disclosure.

Finally, it should also be noted that, in the present text, relation terms such as first and second are merely intended to distinguish one entity or operation from another entity or operation, and that does not necessarily require or imply that those entities or operations have therebetween any such actual relation or order. Furthermore, the terms "include", "comprise" or any variants thereof are intended to cover non-exclusive inclusions, so that processes, methods, articles or terminal devices that include a series of elements do not only include those elements, but also include other elements that are not explicitly listed, or include the elements that are inherent to such processes, methods, articles or terminal devices. Unless further limitation is set forth, an element defined by the wording "comprising a . . . " does not exclude additional same element in the process, method, article or terminal device comprising the element.

The embodiments of the present disclosure are described above with reference to the drawings. However, the present disclosure is not limited to the above particular embodiments. The above particular embodiments are merely illustrative, rather than limitative. A person skilled in the art, under the motivation of the present disclosure, can make many variations without departing from the spirit of the present disclosure and the protection scope of the claims, and all of the variations fall within the protection scope of the present disclosure.

What is claimed is:

1. A method for constructing a real-geographic-space scene in real time based on a panoramic-video technique, wherein the method for constructing the real-geographic-space scene in real time comprises:
   by a high-performance computing device, receiving image data collected by a plurality of panoramic cameras, and combining the image data into an image-data sequence, wherein the plurality of panoramic cameras are controlled by using a remote-control instruction, and the plurality of panoramic cameras are installed in the real-geographic-space scene in a fixing manner or a stringing manner, and provide marking points in the real-geographic-space scene;
   by the high-performance computing device, receiving a three-dimensional geographic coordinate of each of the plurality of panoramic cameras in the scene, wherein the three-dimensional geographic coordinate is, by a measuring robot, acquired by using a prism installed at each of the plurality of panoramic cameras and subsequently sent;
   by the high-performance computing device, receiving external-azimuth parameters from attitude sensors, wherein each of the plurality of panoramic cameras is installed with one of the attitude sensors, and each of the attitude sensors is configured for determining in real time an azimuth angle, a pitch angle and a roll angle of the panoramic camera where the attitude sensor is located, and providing the external-azimuth parameters in photogrammetry, to facilitate subsequent orthographic geometric correction, splicing and optimization of a panoramic image;
   by the high-performance computing device, receiving a scene environment sound, wherein the scene environment sound is acquired and sent by a plurality of audio collecting devices in the real-geographic-space scene;
   by the high-performance computing device, according to different installation modes, the image-data sequence, the marking points, the external-azimuth parameters and the three-dimensional geographic coordinates, performing splicing-stitching and the orthographic geometric correction or distortion correction to the image-data sequence, to obtain an orthographic image or a panoramic-image sequence, wherein the different installation modes use different methods of splicing optimization, the orthographic image is obtained by splicing-stitching and orthographic geometric correction to an image sequence obtained in a fixing-type installation mode, and the panoramic-image sequence is obtained by splicing-stitching and distortion correction to an image sequence obtained in a stringing-type installation mode;
   by the high-performance computing device, performing augmented-reality optimization to the synthesized orthographic image or panoramic-image sequence with the scene environment sound and the three-dimensional geographic coordinates, to obtain a real-geographic-space-scene video streaming having augmented reality, space audios and geographic coordinates located in a geographic-coordinate frame; and
   by the high-performance computing device, sending the real-geographic-space-scene video streaming to an output controlling device, so that the output controlling device displays the real-geographic-space scene in real time, and an operator sends the remote-control instruction by using the output controlling device, to remotely in real time control all or part of the panoramic cameras to shoot or move.

2. The method for constructing the real-geographic-space scene in real time according to claim 1, wherein the marking points comprise a plurality of first marking points and a plurality of second marking points;

the plurality of panoramic cameras are installed in the real-geographic-space scene in a fixing manner or a stringing manner, and provide marking points in the real-geographic-space scene comprises:

if the plurality of panoramic cameras are installed in the real-geographic-space scene in a fixing manner, the plurality of panoramic cameras are installed fixedly and evenly in the real-geographic-space scene, an installation spacing distance is set according to a precision of images collected by the panoramic cameras, while ensuring that a shooting coverage area of each of the panoramic cameras satisfies an application demand of an actual scene, ensuring that a coinciding degree of neighboring images is greater than a threshold, and the plurality of first marking points are individually provided in overlapping view fields of the plurality of panoramic cameras; and if the plurality of panoramic cameras are installed in the real-geographic-space scene in a stringing manner, the plurality of panoramic cameras are installed on a guiding device, the guiding device is divided into a plurality of local line segments, each of the local line segments is installed with at least one of the panoramic cameras, each of the local line segments is capable of independently driving the panoramic camera installed thereon to move, and according to movement speeds and requirement on real-time capabilities of the plurality of panoramic cameras, the plurality of second marking points are provided in the real-geographic-space scene; and each of the local line segments is provided with anticollision rings at two ends, to prevent derailment of the at least one of the panoramic cameras installed on each of the local line segments in movement, and a shooting speed of each of the panoramic cameras matches with a movement speed thereof, to enable a degree of overlapping in the image-data sequence to be sufficient to complete large-range splicing, and to guarantee real-time capabilities of image splicing and fusion in reconstruction of the real-geographic-space scene.

3. The method for constructing the real-geographic-space scene in real time according to claim 2, wherein the step of, by the high-performance computing device, receiving the image data collected by the plurality of panoramic cameras, and combining the image data into the image-data sequence comprises:

according to different installation modes of the plurality of panoramic cameras, using different modes to collect the image data;

if the plurality of panoramic cameras are installed in the fixing manner, according to a demand of a target area, by the high-performance computing device, forwarding the remote-control instruction, controlling the plurality of panoramic cameras to individually collect a real-time panoramic image of the target area, and combining into a real-time-panoramic-image data sequence;

if the plurality of panoramic cameras are installed in the stringing manner, according to a demand of the target area, by the high-performance computing device, forwarding the remote-control instruction, and controlling a movement mode of the plurality of panoramic cameras by using the guiding device, wherein the movement mode comprises that each of the plurality of panoramic cameras moves independently, or that some of the panoramic cameras move synchronously;

if the plurality of panoramic cameras are controlled to move synchronously, by the high-performance computing device, receiving dynamic-image data of the target area and a non-target area that are collected by each of the plurality of panoramic cameras, and combining into a dynamic-image data sequence; and if part of the plurality of panoramic cameras are controlled to move independently, by the high-performance computing device, receiving dynamic-image data of the target area that are collected by the part of the plurality of panoramic cameras, receiving static-image data of the non-target area that are collected by motionless panoramic cameras, and combining into a dynamic-image data sequence.

4. The method for constructing the real-geographic-space scene in real time according to claim 1, wherein the measuring robot, after acquiring the three-dimensional geographic coordinate of the prism, by using a relative deviation amount between the prism and a lens center of the panoramic camera where the prism is located, determines the three-dimensional geographic coordinate of each of the panoramic cameras;

the measuring robot is a precise instrument for automatically locating a target prism, core components of the measuring robot comprises a gyroscopic north seeker and a smart total station, the gyroscopic north seeker performs north seeking to complete locating of the measuring robot, and the smart total station, on the basis that the locating is completed, by automatically identifying and tracking the prism, measures a horizontal angle, a vertical angle and a three-dimensional distance between the smart total station and the target prism at the same time, and outputs the three-dimensional geographic coordinate of the target prism in real time; and the three-dimensional geographic coordinate comprises a real-time three-dimensional geographic coordinate of each of the plurality of panoramic cameras in movement, and a fixed three-dimensional geographic coordinate of each of the plurality of panoramic cameras when stationary, and the three-dimensional geographic coordinates are used as the external-azimuth parameters required by the photogrammetry, and are used for the subsequent orthographic geometric correction, splicing-stitching and augmented-reality optimization of the images.

5. The method for constructing the real-geographic-space scene in real time according to claim 1, wherein each of the attitude sensors is a high-performance three-dimensional-movement-attitude measuring system, and comprises auxiliary movement sensors comprising a three-axis gyroscope, a three-axis accelerometer and a three-axis electronic compass.

6. The method for constructing the real-geographic-space scene in real time according to claim 1, wherein the plurality of audio collecting devices are separately installed in the real-geographic-space scene, and have unique marking numbers, so that the plurality of audio collecting devices collect the scene environment sound of the real-geographic-space scene in a full-covering manner; and each of the plurality of audio collecting devices, when sending the scene environment sound collected thereby, carries the unique marking number thereof, so that subsequently the operator hears the sound by using the output controlling device and senses a position emitting the sound.

7. The method for constructing the real-geographic-space scene in real time according to claim 3, wherein the step of, by the high-performance computing device, according to the different installation modes, the image-data sequence, the marking points, the external-azimuth parameters and the three-dimensional geographic coordinates, performing splicing-stitching and the orthographic geometric correction or distortion correction to the image-data sequence, wherein the different installation modes use the different methods of splicing optimization comprises:

if the plurality of panoramic cameras are installed in the fixing manner, by the high-performance computing device, receiving the real-time-panoramic-image data sequence, and based on the real-time-panoramic-image data sequence, forming a fixing-type panoramic-video sequence;

by the high-performance computing device, according to a practical demand, by using information of the marking points, a feature-extraction algorithm and a computer-vision method, performing quick feature extraction and matching to the fixing-type panoramic-video sequence;

by the high-performance computing device, by using a photogrammetric method, spatial positions and attitudes of the plurality of panoramic cameras, and the external-azimuth parameters, by using photogrammetry and a computer-vision technique, performing orthographic correction and image splicing to the fixing-type panoramic-video sequence obtained after the quick feature extraction and matching, to obtain a panoramic orthographic image, wherein an area of the panoramic orthographic image is greater than an area of the real-time panoramic image;

if the plurality of panoramic cameras are installed in a stringing manner, by the high-performance computing device, receiving the dynamic-image data sequence, and based on the dynamic-image data sequence, forming a stringing-type panoramic-video sequence;

by the high-performance computing device, by using a feature-extraction algorithm and by using the marking points, performing quick feature extraction and matching to the stringing-type panoramic-video sequence; and by the high-performance computing device, by using a photogrammetric method and the external-azimuth parameters, based on the stringing-type panoramic-video sequence obtained after the quick feature extraction and matching, performing quick splicing-stitching and distortion correction to the images, to obtain the panoramic-image sequence.

8. The method for constructing the real-geographic-space scene in real time according to claim 7, wherein the step of, by the high-performance computing device, performing the augmented-reality optimization to the synthesized orthographic image or panoramic-image sequence with the scene environment sound and the three-dimensional geographic coordinates, to obtain the real-geographic-space-scene video streaming having augmented reality, space audios and geographic coordinates located in the geographic-coordinate frame comprises:

by the high-performance computing device, based on the panoramic orthographic image, according to the three-dimensional geographic coordinates and the external-azimuth parameters, according to a spatial perspective relation, determining correct placement positions in a real space environment of an object in the target area and an object in the non-target area, and constructing a three-dimensional scene corresponding to the real-geographic-space scene;

by the high-performance computing device, fusing the scene environment sound into the three-dimensional scene, to obtain the real-geographic-space-scene video streaming having augmented reality, space audios and geographic coordinates located in the geographic-coordinate frame;

or, by the high-performance computing device, based on the panoramic-video sequence, according to the three-dimensional geographic coordinates and the external-azimuth parameters, according to a spatial perspective relation, determining correct placement positions in a real space environment of an object in the target area and an object in the non-target area, and constructing a three-dimensional scene corresponding to the real-geographic-space scene; and by the high-performance computing device, fusing the scene environment sound into the three-dimensional scene, to obtain the real-geographic-space-scene video streaming having augmented reality, space audios and geographic coordinates located in the geographic-coordinate frame.

9. The method for constructing the real-geographic-space scene in real time according to claim 2, wherein an illuminating device and a dust automatically-washing device are installed on both of two sides of each of the local line segments;

the illuminating device enables an environment within a shooting area of the plurality of panoramic cameras to be clearly visible; and the dust automatically-washing device enables the plurality of panoramic cameras to individually move smoothly.

10. The method for constructing the real-geographic-space scene in real time according to claim 3, wherein each of the plurality of panoramic cameras is provided with a remote-control interface, and a fish-eye lens or a reflecting mirror surface or a lens spliced by a plurality of common lenses facing different directions;

the fish-eye lens or the reflecting mirror surface or the lens spliced by the plurality of common lenses facing different directions enables each of the plurality of panoramic cameras to have a panoramic view field of totally 720° in the horizontal direction and the vertical direction, and not have a center blind area; and the remote-control interface is configured for receiving the remote-control instruction, so that the operator performs remote real-time manipulation to the plurality of panoramic cameras via a wired network or a wireless network, wherein the wired or wireless network is a 5G network, and the remote-control instruction comprises a spatial-pose instruction of adjusting the panoramic cameras according to a shooting demand of the target area, and a shot-image-size instruction.

11. The method for constructing the real-geographic-space scene in real time according to claim 1, wherein the output controlling device comprises an intelligent displaying device or a head-worn VR device;

the head-worn VR device performs automatic augmentation to a viewpoint brightness of a visual region of the operator, and based on the real-geographic-space-scene video streaming, displays attribute information and real-geographic-coordinate information of a target object within the visual region; and the operator, by using the intelligent displaying device or the head-worn VR device, remotely in real time controls all or some of the panoramic cameras, to shoot any target area, and sends corresponding controlling parameters thereto.

12. An apparatus for constructing a real-geographic-space scene in real time based on a panoramic-video technique, wherein the apparatus for constructing the real-geographic-space scene is applied in a high-performance computing device, and the high-performance computing device comprises:

an image-data receiving module configured for receiving image data collected by a plurality of panoramic cameras, and combining the image data into an image-data sequence, wherein the plurality of panoramic cameras are controlled by using a remote-control instruction, and the plurality of panoramic cameras are installed in the real-geographic-space scene in a fixing manner or a stringing manner, and provide marking points in the real-geographic-space scene;

a three-dimensional-geographic-coordinate receiving module configured for receiving a three-dimensional geographic coordinate of each of the plurality of panoramic cameras, wherein the three-dimensional geographic coordinate is, by a measuring robot, acquired by using a prism installed at each of the plurality of panoramic cameras and subsequently sent;

a panoramic-camera-spatial-attitude receiving module configured for receiving external-azimuth parameters from attitude sensors, wherein each of the plurality of panoramic cameras is installed with one of the attitude sensors, each of the attitude sensors is a high-performance three-dimensional-movement-attitude measuring system, and comprises auxiliary movement sensors comprising a three-axis gyroscope, a three-axis accelerometer and a three-axis electronic compass, and each of the attitude sensors is configured for determining in real time an azimuth angle, a pitch angle and a roll angle of the panoramic camera where the attitude sensor is located, and providing the external-azimuth parameters in photogrammetry, to facilitate subsequent orthographic geometric correction, splicing and optimization of a panoramic image;

a sound receiving module configured for receiving a scene environment sound, wherein the scene environment sound is acquired and sent by a plurality of audio collecting devices in the real-geographic-space scene;

a splicing module configured for, according to different installation modes, the image-data sequence, the marking points, the external-azimuth parameters and the three-dimensional geographic coordinates, performing splicing-stitching and orthographic geometric correction or distortion correction to the image-data sequence, to obtain an orthographic image or a panoramic-image sequence, wherein the different installation modes use different methods of splicing optimization, the orthographic image is obtained by splicing-stitching and orthographic geometric correction to an image sequence obtained in a fixing-type installation mode, and the panoramic-image sequence is obtained by splicing-stitching and distortion correction to an image sequence obtained in a stringing-type installation mode;

an augmented-reality optimizing module configured for performing augmented-reality optimization to the synthesized orthographic image or panoramic-image sequence with the scene environment sound and the three-dimensional geographic coordinates, to obtain a real-geographic-space-scene video streaming having augmented reality, space audios and geographic coordinates located in a geographic-coordinate frame; and a sending module configured for sending the real-geographic-space-scene video streaming to an output controlling device, so that the output controlling device displays the real-geographic-space scene in real time, and an operator sends the remote-control instruction by using the output controlling device, to remotely in real time control all or part of the panoramic cameras to shoot or move.

* * * * *